Sept. 29, 1959     W. H. TAPLIN ET AL     2,906,775
PROCESS FOR PRODUCING AROMATIC ACIDS
Filed May 6, 1957
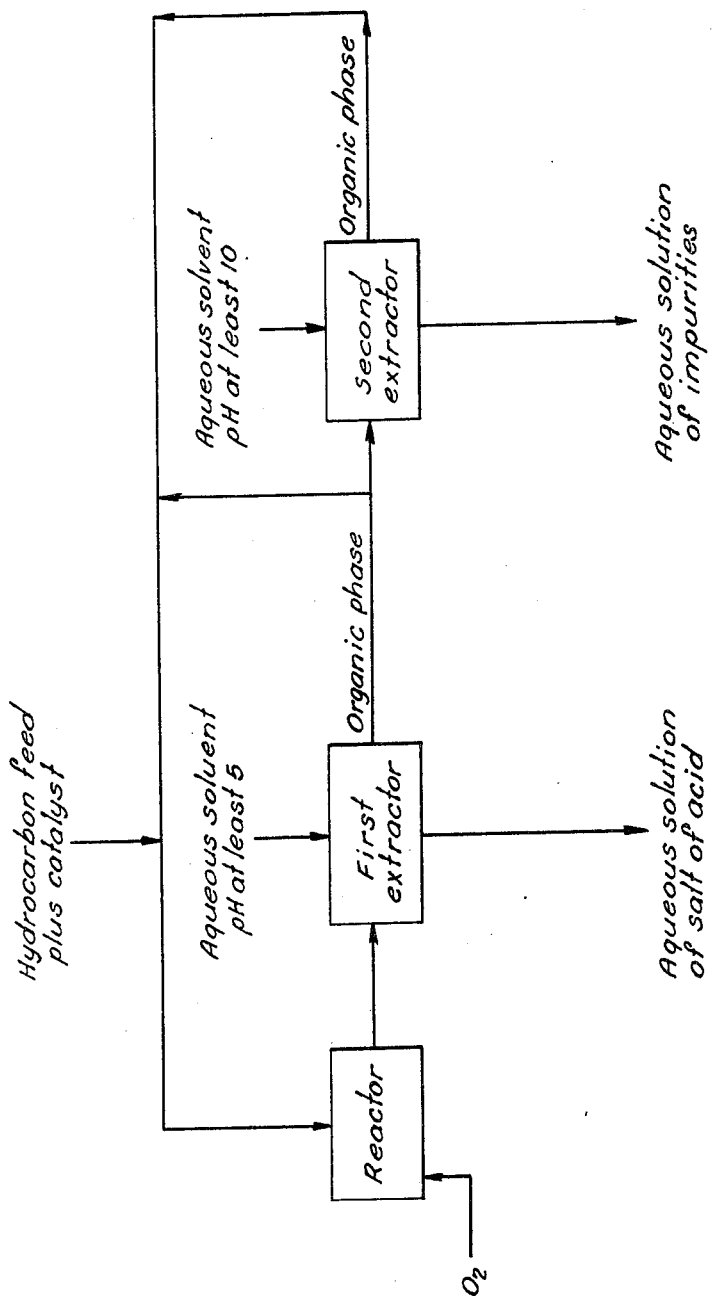
INVENTORS.
William H. Taplin
Guy H. Harris
BY Griswold & Burdick
ATTORNEYS

United States Patent Office 2,906,775
Patented Sept. 29, 1959

2,906,775
PROCESS FOR PRODUCING AROMATIC ACIDS

William H. Taplin and Guy H. Harris, Concord, Calif., assignors to The Dow Chemical Company, Midland, Mich., a corporation of Delaware Application May 6, 1957, Serial No. 657,128

11 Claims. (Cl. 260—524)

This invention relates to processes for making aromatic carboxylic acids, and more particularly, to improvements in known processes wherein aromatic compounds are catalytically oxidized by air or other form of molecular oxygen to produce such acids.

It is well known to oxidize various aromatic compounds, such as toluene, xylene, cumene, cymene, t-butyltoluene and, in general, aromatic compounds having aliphatic substituents attached to the aromatic nucleus through an aliphatic carbon atom bearing at least one hydrogen atom, by use of molecular oxygen and an oxidation catalyst which is commonly a cobalt compound, whereby one or more of the aliphatic substituents is converted to a carboxyl group. In such processes, the oxidation step is only partial; that is, a large, and usually a preponderant, portion of the aromatic feed material passes through the oxidation step unchanged. This unconverted material must be separated and recycled to make the process practical. Moreover, of the relatively small portion that is oxidized per pass, only a part is converted to the desired carboxylic acid. Other products may be divided into two classes: (1) desirable intermediate products, such as alcohols, aldehydes and esters, which, when recycled to the reactor, can be further oxidized to the desired acids, and (2) undesirable byproducts which if recycled are not converted to the desired acids and which, moreover, may poison the catalyst.

According to the invention, an aromatic hydrocarbon is subjected to partial oxidation with molecular oxygen, preferably air, in the presence of a heavy metal oxidation catalyst, preferably a cobalt compound, in a reactor which is preferably operated on a continuous basis. The effluent stream from the reactor contains a major proportion of unchanged hydrocarbon and minor proportions of the desired carboxylic acid, intermediates which on further oxidation are converted to the desired acid, and undesired byproducts not oxidizable to the desired acid, at least some of which are capable of poisoning the oxidation catalyst. This effluent is contacted at a pH of 5 to 9, and preferably 7 to 8, with an aqueous solvent whereby the desired acid is converted to the salt form and dissolved in the aqueous phase. The latter is then separated from the organic phase and the desired acid is recovered by any suitable means, such as by acidification of the aqueous solvent with a mineral acid, whereby the desired acid is precipitated from the solvent and may be separated therefrom by filtration or other suitable means.

The organic phase remaining after the above extraction of the reactor effluent contains the unchanged aromatic hydrocarbon, intermediate oxidized materials, and undesired byproducts and catalyst poisons. It is purified sufficiently to be recycled to the reactor by contacting at least a portion of it at a pH of at least 10 with a strong aqueous alkaline solvent. This solvent dissolves impurities and other catalyst poisons and may then be separated from the organic phase, the latter then being suitable for recycling to the reactor.

Since the formation of undesired impurities and catalyst poisons is generally slower than the formation of the desired carboxylic acid, it is often preferably for reasons of economy to submit only a fraction, such as ⅓ or ½, of the reactor effluent to the second extraction step, the remainder being recycled to the reactor directly after the first extraction step.

The process of the invention is schematically diagrammed in Figure I, which is a flow sheet of the process.

In Figure I it is seen that the aromatic hydrocarbon, the catalyst and oxygen are fed into a reactor, the effluent from which is fed to a first extractor where it is contacted at pH 5–9 with an aqueous solvent. The aqueous phase from the extractor contains the salt of the desired acid from which the acid may be recovered, as by acidification and filtration.

The organic phase effluent from the first extractor is fed, in whole or in part, to the second extractor where it is contacted at a pH of at least 10 with a strong aqueous alkaline solvent. This solvent removes undesired byproducts and catalyst poisons so that the organic phase is then suitable for recycling to the reactor. Any of the organic phase obtained from the first extractor that is not sent to the second extractor is recycled directly to the reactor.

While the process of the invention may be operated batchwise, it is especially suitable for continuous operation and is more efficient when so operated.

In the first extractor, the solvent added to the extractor is preferably a buffered aqueous solution having a pH of 7 to 8. Suitable solutes for such a solution include alkali metal carbonates and bicarbonates, the preferred one being sodium bicarbonate. Solutions of alkali metal hydroxides may be used, in which case the amount added is dictated by the pH of the aqueous phase in the extractor. Conventional pH measurement or indicating techniques may be used to control the addition of the solvent to the extractor so that the pH of the aqueous phase is maintained between 5 and 9. The use of solutions of alkali metal hydroxide in high dilution, so that the pH of the solution being added is nearly that of the aqueous phase, has practical disadvantages because of the large volumes of solution to be handled.

The amount of aqueous solvent used in the first extractor is not critical, it merely being desirable to use enough to neutralize and dissolve all carboxylic acid in the reactor effluent being treated. A large excess is undesirable for economic reasons since such excess is wasted. Most economical operation is attained when the alkalinity of the aqueous solvent is just sufficient to extract substantially all carboxylic acid in the reactor effluent.

The aqueous solvent used for the second extractor should have a pH of at least 10 and preferably at least 11. Practically speaking, this requires the use of an alkali metal hydroxide, preferably sodium hydroxide. The concentration and volume of the aqueous alkali solvent are unimportant so long as the organic phase being treated is intimately contacted with an aqueous phase wherein the pH is maintained at least as high as 10.

While the design and operation of the two extractor units are outside the present invention, it is readily apparent that they should be effective liquid-liquid contactors, preferably adapted for counter-current flow so that most efficient use may be made of the aqueous alkaline solvents used therein. While they may be operated batchwise or intermittently, the highest efficiency is attainable by continuous operation.

The practice of the invention is illustrated by the following examples.

Example 1

Twenty-five pounds of commercial o-xylene, which contained about 9 percent of m-xylene, was placed in a reactor with 0.024 pound of cobalt in the form of the 2-ethylhexoate salt and heated at 140° C. while air was passed through it. After 25 hours the material was cooled and intimately contacted with sufficient 8 percent aqueous sodium bicarbonate solution to react with all toluic acid present. The organic phase was separated from the bicarbonate solution and then similarly contacted with an 8 percent aqueous solution of sodium hydroxide until nothing more was extracted. The organic phase was then returned to the reactor with sufficient fresh xylene and catalyst to restore the original amounts.

A continuous run was then begun in which the reactor was operated at 140° C. and air was passed in at the rate of 19 gram moles per hour. Every 2.5 hours ⅓ of the reactor contents were removed and extracted with an equal volume of 8 percent aqueous sodium bicarbonate solution. Every third time this was done the organic phase was further extracted with an equal volume of 8 percent aqueous sodium hydroxide. The organic phases were then returned to the reactor, together with sufficient fresh xylene and catalyst to replace that lost or consumed.

After 109 hours of the above operation the process was stopped. Throughout the run the efficiency of the catalyst was followed by determining the oxygen content of the effluent gas. This never rose above 4 percent and at the end of the run was only 2.5 percent, showing that the catalyst was active and that catalyst poisons were substantially absent.

During the run a total of 31.72 pounds of xylene was consumed. Acidification of the bicarbonate extracts resulted in the precipitation of 23.6 pounds of essentially pure toluic acid, 95 percent being the ortho-isomer.

*Example 2*

The material remaining in the reactor at the end of the run in Example 1 was heated to 140° C. and the run was continued as before except that each bicarbonate extraction was followed by a sodium hydroxide extraction. During 100 hours of operation the catalyst remained highly active and toluic acid was obtained in a yield and purity at least equal to those of Example 1.

*Example 3*

In an experiment otherwise similar to that of Example 2, the bicarbonate solution was replaced with an aqueous solution of sodium carbonate having a pH of 7.5. The results were substantially identical to those of Example 2.

*Example 4*

In an experiment otherwise identical to that of Example 2, the bicarbonate solution being added to the first extractor was replaced with an aqueous solution containing about 8 percent sodium hydroxide. The pH of the aqueous phase was controlled to about 7.5. The results were substantially identical to those of Example 2.

*Example 5*

In an experiment otherwise identical to that of Example 1, the second extraction with sodium hydroxide solution was omitted and the organic phase from the bicarbonate extraction was recycled without further treatment.

The reactor operated normally during the first 38 hours, there being less than 5 percent of oxygen in the effluent gas. However, as the concentration of catalyst poisons built up, the efficiency of the process gradually fell so that during the next 20 hours the oxygen content of the effluent gas rose to 10 percent. Repeated addition of large amounts of fresh catalyst failed to restore the efficiency so that after another 20 hours hardly any oxidation was taking place. Replacing the bicarbonate solution with a sodium carbonate solution having a pH of 9.4 also failed to reactivate the process, although the use of such a solution in a process in which a second extraction was made with a solution of pH at least 10 was entirely satisfactory.

*Example 6*

In an experiment otherwise similar to that of Example 1, an excess of a 5 percent aqueous solution of sodium hydroxide was used as the sole extractant of the reactor effluent so that the pH of the aqueous phase in the extractor was greater than about 10.

While the catalyst poisons were effectively removed from the effluent and the activity of the catalyst in the process was unimpaired, the toluic acid obtained by acidification of the aqueous alkali solution was badly discolored and was of less than 90 percent purity.

*Example 7*

A reactor was charged with 340 grams of p-tert.-butyl toluene, 0.38 gram of cobalt (as cobaltous 2-ethylhexoate) and 50 milliliters of benzene, the latter being for the purpose of facilitating the removal of water from the system. The reactor was maintained at 140° C. while air was bubbled through the contents at the rate of 1.5 liters/minute at atmospheric pressure. Vapors were condensed in a reflux condenser fitted with a phase separator so that water was separated while the organic layer was returned to the reactor.

At intervals of approximately 8 hours, portions of the reactor contents were withdrawn for analysis and for alkaline extraction of p-tert.-butyl benzoic acid and by-products. When the reactor effluent was extracted with a saturated aqueous solution of sodium bicarbonate and the aqueous extract was subsequently acidified, high grade, pure white p-tert.-butyl benzoic acid was obtained in good yield. When instead of sodium bicarbonate, a saturated aqueous solution of sodium carbonate was used in the extraction, substantially similar results were obtained, though the p-tert.-butyl benzoic acid obtained was of slightly lower purity. When, instead of bicarbonate or carbonate, a 5 percent aqueous solution of sodium hydroxide was used without control of the pH, the p-tert.-butyl benzoic acid obtained was badly discolored and highly impure.

Thus, when only a single extraction step was used and the extractant was aqueous sodium bicarbonate or carbonate, the product obtained was of high quality but catalyst poisons gradually accumulated in the reactor while when the extractant was strong alkali the catalyst poisons were removed but the product was of poor quality. However, by use of a two-stage extraction like that described in Example 1, in which sodium carbonate or bicarbonate is used in the first and sodium hydroxide is used in the second stage, high quality product can be produced consistently while accumulation of catalyst poisons is at the same time avoided.

Results similar to those described above are obtained when other aromatic carboxylic acids are produced by the catalytic air oxidation of suitable aromatic hydrocarbons. The latter include meta- and para-xylenes, tri- and tetra-methylbenzenes, cumene, cymene, tert.-butyltoluene, tert.-amyltoluene and in general, compounds having the formula

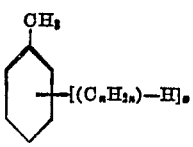

wherein $n$ is an integer from 1 to 5 and $x$ is an integer from 0 to 4, $x$ being not more than 1 when $n$ exceeds 1.

In order to avoid complex mixtures of carboxylic acids in the product, we prefer to oxidize only those hydrocarbons having not more than 1 aliphatic side chain containing more than 1 carbon atom; that is, when $n$ exceeds 1, $x$ should not exceed 1.

We claim:
1. In a process for producing an aromatic carboxylic acid by the catalytic air oxidation of an aromatic hydrocarbon having the formula

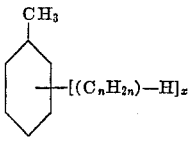

wherein $n$ is an integer from 1 to 5 and $x$ is an integer from 0 to 4, $x$ being not more than 1 when $n$ exceeds 1, said oxidation being conducted in a reactor from which is obtained an effluent comprising the desired acid, unoxidized hydrocarbon and undesired byproduct, the improvement comprising contacting the effluent with an aqueous solvent the volume of which is sufficient to dissolve substantially all the carboxylic acid in the effluent and the pH of which is maintained at about 5 to 9 during said contacting step, thus to form a first aqueous phase and a first organic phase, separating these phases, contacting at least a substantial portion of the first organic phase with a second aqueous solvent having a pH of at least about 10, thus to form a second aqueous phase and a second organic phase, separating the second phases, returning the second organic phase and any remainder of the first organic phase to the reactor as part of the aromatic hydrocarbon fed thereto, and recovering aromatic carboxylic acid from the first aqueous phase.

2. A process as defined in claim 1 wherein $n$ is 1.
3. A process as defined in claim 2 wherein $x$ is 1.
4. A process as defined in claim 1 wherein the hydrocarbon is o-xylene.
5. A process as defined in claim 1 wherein the hydrocarbon is a tert.-alkyl toluene.
6. A process as defined in claim 5 wherein the tert.-alkyl toluene is p-tert.-butyl toluene.
7. A process as defined in claim 1 wherein the first aqueous solvent has a pH of about 7 to 8.
8. A process as defined in claim 7 wherein the first aqueous solvent is essentially an aqueous solution of sodium bicarbonate.
9. A process as defined in claim 1 wherein the second aqueous solvent is essentially an aqueous solution of sodium hydroxide.

10. In a process for producing o-toluic acid by the catalytic air oxidation of o-xylene in a reactor from which is obtained an effluent comprising o-toluic acid, catalyst, o-xylene, intermediate products which on further oxidation are convertible to o-toluic acid, undesired by-products and catalyst poisons, and wherein said by-products and poisons are separated as one product, said o-toluic acid is separated as another product and said other components are recycled to the reactor, the improvement comprising intimately contacting said reactor effluent with an aqueous solution of an alkali metal salt of carbonic acid, said solution being maintained at a pH of about 7 to 8 during said contacting step and being used in an amount sufficient to dissolve substantially all the o-toluic acid in said effluent, thus to form a first aqueous phase and a first organic phase; separating said phases; intimately contacting at least a substantial portion of said organic phase with a second aqueous solvent consisting essentially of an aqueous solution of an alkali metal hydroxide, being maintained at a pH of at least about 10 during said contacting step and being used in an amount sufficient to dissolve at least a substantial portion of the said undesired by-products and catalyst poisons in said organic phase, thus to form a second aqueous phase and a second organic phase; separating said phases; recycling said second organic phase and any remainder of said first organic phase to the reactor and recovering o-toluic acid from said first aqueous phase.

11. A process as defined in claim 10 wherein the alkali metal is sodium.

References Cited in the file of this patent

UNITED STATES PATENTS

| | | |
|---|---|---|
| 1,822,016 | Daniels | Sept. 8, 1931 |
| 2,788,367 | Bills et al. | Apr. 6, 1957 |

OTHER REFERENCES

Heilbron: Dictionary of Organic Compounds, vol. IV, pg. 404 (1953).

Montgomery et al.: Ind. & Eng. Chem., vol. 47, No. 6, pgs. 1274–6 (1955).